US010635932B2

(12) United States Patent
Goenka et al.

(10) Patent No.: US 10,635,932 B2
(45) Date of Patent: Apr. 28, 2020

(54) DATABASE SYSTEMS AND USER INTERFACES FOR DYNAMIC AND INTERACTIVE MOBILE IMAGE ANALYSIS AND IDENTIFICATION

(71) Applicant: Palantir Technologies Inc., Palo Alto, CA (US)

(72) Inventors: Aakash Goenka, London (GB); Arzav Jain, Santa Clara, CA (US); Alexander Taheri, New York City, NY (US); Daniel Isaza, Redmond, WA (US); Jack Zhu, Stanford, CA (US); William Manson, Palo Alto, CA (US); Vehbi Deger Turan, Stanford, CA (US); Stanislaw Jastrzebski, Cracow (PL)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 0 days.

(21) Appl. No.: 16/414,483

(22) Filed: May 16, 2019

(65) Prior Publication Data
US 2019/0272443 A1    Sep. 5, 2019

Related U.S. Application Data

(63) Continuation of application No. 16/027,813, filed on Jul. 5, 2018, now Pat. No. 10,339,416, which is a (Continued)

(51) Int. Cl.
*G06K 9/62* (2006.01)
*G06F 16/58* (2019.01)
(Continued)

(52) U.S. Cl.
CPC ....... *G06K 9/6202* (2013.01); *G06F 16/2379* (2019.01); *G06F 16/58* (2019.01);
(Continued)

(58) Field of Classification Search
CPC .... G06K 9/6202; G06K 9/00255; G06K 9/22; G06K 9/46; G06F 16/2379; G06F 16/58; G06F 16/583
See application file for complete search history.

(56) References Cited

U.S. PATENT DOCUMENTS

| 5,021,792 A | 6/1991 | Hwang |
| 5,555,503 A | 9/1996 | Kyrtsos et al. |
| (Continued) | | |

FOREIGN PATENT DOCUMENTS

| EP | 2400448 | 12/2011 |
| EP | 2816513 | 12/2014 |
| (Continued) | | |

OTHER PUBLICATIONS

Notice of Allowance for U.S. Appl. No. 13/181,392 dated Jan. 22, 2015.
(Continued)

*Primary Examiner* — Gregory M Desire
(74) *Attorney, Agent, or Firm* — Knobbe, Martens, Olson & Bear, LLP

(57) ABSTRACT

Embodiments of the present disclosure relate to systems, techniques, methods, and computer-readable mediums for one or more database systems configured to perform image identification of an image captured using a remote mobile device, and display of identity information associated with the captured image on the remote mobile device, in communication with the database system(s). A system obtains an image captured using a camera on a remote mobile device and performs image analysis to identify the captured image using reference images in one or more databases. The system can present the results for display an interactive user interface on the remote mobile device.

20 Claims, 12 Drawing Sheets

Related U.S. Application Data continuation of application No. 15/701,886, filed on Mar. 16, 2016, now Pat. No. 10,043,102.

(60) Provisional application No. 62/280,867, filed on Jan. 20, 2016.

(51) Int. Cl.

| | | |
|---|---|---|
| *G06F 16/583* | (2019.01) | |
| *G06F 16/23* | (2019.01) | |
| *G06K 9/00* | (2006.01) | |
| *G06K 9/22* | (2006.01) | |
| *G06K 9/46* | (2006.01) | |

(52) U.S. Cl.
CPC ....... *G06F 16/583* (2019.01); *G06K 9/00255* (2013.01); *G06K 9/22* (2013.01); *G06K 9/46* (2013.01)

(56) References Cited

U.S. PATENT DOCUMENTS

| | | |
|---|---|---|
| 5,670,987 A | 9/1997 | Doi et al. |
| 6,141,659 A | 10/2000 | Barker et al. |
| 6,189,003 B1 | 2/2001 | Leal |
| 6,272,489 B1 | 8/2001 | Rauch et al. |
| 6,642,945 B1 | 11/2003 | Sharpe |
| 7,188,100 B2 | 3/2007 | De Bellis et al. |
| 7,383,053 B2 | 6/2008 | Kent et al. |
| 7,523,100 B1 | 4/2009 | Bionda et al. |
| 7,529,734 B2 | 5/2009 | Dirisala |
| 7,652,622 B2 | 1/2010 | Hansen et al. |
| 7,706,817 B2 | 4/2010 | Bamrah et al. |
| 7,725,547 B2 | 5/2010 | Albertson et al. |
| 7,747,648 B1 | 6/2010 | Kraft et al. |
| 7,945,470 B1 | 5/2011 | Cohen et al. |
| 8,028,894 B2 | 10/2011 | Lapstun et al. |
| 8,402,047 B1 | 3/2013 | Mangini et al. |
| 8,521,135 B2 | 8/2013 | Cryderman |
| 8,739,059 B2 | 5/2014 | Rabenold et al. |
| 8,762,870 B2 | 6/2014 | Robotham et al. |
| 8,792,676 B1* | 7/2014 | Jing ....................... G01C 21/20 382/100 |
| 8,805,079 B2 | 8/2014 | Petrou et al. |
| 8,849,254 B2 | 9/2014 | Bolon |
| 8,959,361 B2 | 2/2015 | Mullin |
| 9,037,407 B2 | 5/2015 | Thompson |
| 9,123,086 B1 | 9/2015 | Freeland et al. |
| 9,183,429 B2 | 11/2015 | Qi et al. |
| 9,239,849 B2 | 1/2016 | Forutanpour et al. |
| 9,262,529 B2 | 2/2016 | Colgrove et al. |
| 9,275,069 B1 | 3/2016 | Garrod et al. |
| 9,301,103 B1 | 3/2016 | Thompson |
| 9,311,554 B2 | 4/2016 | Boncyk et al. |
| 9,313,233 B2 | 4/2016 | Sprague et al. |
| 9,317,775 B2* | 4/2016 | Moraleda ........... G06K 9/00624 |
| 9,436,704 B2* | 9/2016 | Gershon ................ G06T 7/11 |
| 10,043,102 B1 | 8/2018 | Goenka et al. |
| 2003/0152277 A1 | 8/2003 | Hall et al. |
| 2003/0227746 A1 | 12/2003 | Sato |
| 2004/0203380 A1 | 10/2004 | Hamdi et al. |
| 2005/0125436 A1 | 6/2005 | Mudunuri et al. |
| 2005/0143096 A1 | 6/2005 | Boesch |
| 2005/0169529 A1 | 8/2005 | Owechko et al. |
| 2005/0210409 A1 | 9/2005 | Jou |
| 2006/0116991 A1 | 6/2006 | Calderwood |
| 2006/0206235 A1 | 9/2006 | Shakes et al. |
| 2006/0250764 A1 | 11/2006 | Howarth et al. |
| 2007/0043744 A1 | 2/2007 | Carro |
| 2007/0071290 A1 | 3/2007 | Shah et al. |
| 2007/0118547 A1 | 5/2007 | Gupta et al. |
| 2007/0130541 A1 | 6/2007 | Louch et al. |
| 2007/0133947 A1* | 6/2007 | Armitage ............ G06F 16/5838 386/224 |
| 2007/0198571 A1 | 8/2007 | Ferguson et al. |
| 2007/0250491 A1 | 10/2007 | Olszak et al. |
| 2008/0007618 A1 | 1/2008 | Yuasa |
| 2008/0227473 A1 | 9/2008 | Haney |
| 2008/0252419 A1 | 10/2008 | Batchelor et al. |
| 2009/0005070 A1 | 1/2009 | Forstall et al. |
| 2009/0138790 A1 | 5/2009 | Larcheveque et al. |
| 2009/0143052 A1 | 6/2009 | Bates et al. |
| 2009/0156231 A1 | 6/2009 | Versteeg et al. |
| 2009/0265105 A1 | 10/2009 | Davis et al. |
| 2009/0315679 A1 | 12/2009 | Bauchot et al. |
| 2009/0319388 A1* | 12/2009 | Yuan ................. G06Q 30/0601 705/26.1 |
| 2010/0058212 A1 | 3/2010 | Belitz et al. |
| 2010/0073315 A1 | 3/2010 | Lee et al. |
| 2010/0082842 A1 | 4/2010 | Lavrov et al. |
| 2010/0121817 A1 | 5/2010 | Meyer et al. |
| 2010/0173619 A1 | 7/2010 | Hua et al. |
| 2010/0185984 A1 | 7/2010 | Wright et al. |
| 2010/0191884 A1 | 7/2010 | Holenstein et al. |
| 2010/0214117 A1 | 8/2010 | Hazzani |
| 2010/0223543 A1 | 9/2010 | Marston |
| 2010/0281458 A1 | 11/2010 | Paladino et al. |
| 2010/0306713 A1 | 12/2010 | Geisner et al. |
| 2011/0022312 A1 | 1/2011 | McDonough et al. |
| 2011/0064281 A1 | 3/2011 | Chan |
| 2011/0093440 A1 | 4/2011 | Asakura et al. |
| 2011/0125735 A1 | 5/2011 | Petrou |
| 2011/0158469 A1 | 6/2011 | Mastykarz |
| 2011/0202557 A1 | 8/2011 | Atsmon et al. |
| 2011/0310005 A1 | 12/2011 | Chen et al. |
| 2012/0010812 A1 | 1/2012 | Thompson |
| 2012/0015673 A1 | 1/2012 | Klassen et al. |
| 2012/0032975 A1 | 2/2012 | Koch |
| 2012/0036434 A1 | 2/2012 | Oberstein |
| 2012/0128251 A1 | 5/2012 | Petrou et al. |
| 2012/0150578 A1 | 6/2012 | Mangat et al. |
| 2012/0166929 A1 | 6/2012 | Henderson et al. |
| 2012/0216106 A1 | 8/2012 | Casey |
| 2012/0250950 A1 | 10/2012 | Papakipos et al. |
| 2012/0268269 A1 | 10/2012 | Doyle |
| 2013/0005362 A1 | 1/2013 | Borghei |
| 2013/0013642 A1 | 1/2013 | Klein et al. |
| 2013/0088337 A1 | 4/2013 | Blanchflower et al. |
| 2013/0143597 A1 | 6/2013 | Mitsuya et al. |
| 2013/0165069 A1 | 6/2013 | Nitta et al. |
| 2013/0196614 A1 | 8/2013 | Pahlevani |
| 2013/0235749 A1 | 9/2013 | Cho et al. |
| 2013/0262171 A1 | 10/2013 | Solodko et al. |
| 2013/0262497 A1 | 10/2013 | Case et al. |
| 2013/0295970 A1 | 11/2013 | Sheshadri et al. |
| 2014/0176750 A1 | 6/2014 | Pajak et al. |
| 2014/0258827 A1 | 9/2014 | Gormish et al. |
| 2014/0294257 A1 | 10/2014 | Tussy |
| 2014/0302783 A1 | 10/2014 | Aiuto et al. |
| 2014/0357299 A1 | 12/2014 | Xu et al. |
| 2015/0080012 A1 | 3/2015 | Sprague et al. |
| 2015/0331919 A1 | 11/2015 | Freeland et al. |
| 2016/0110458 A1 | 4/2016 | Colgrove et al. |
| 2016/0148211 A1 | 5/2016 | Stibel et al. |
| 2016/0292507 A1 | 10/2016 | Ghoson et al. |
| 2017/0337670 A1* | 11/2017 | Guermoud ................ G06T 5/40 |
| 2018/0137201 A1* | 5/2018 | Longbin ............. G06K 9/00624 |
| 2018/0314910 A1 | 11/2018 | Goenka et al. |
| 2019/0147246 A1* | 5/2019 | Bossut .................... H04L 51/32 382/103 |

FOREIGN PATENT DOCUMENTS

| | | |
|---|---|---|
| EP | 2916276 | 9/2015 |
| WO | WO 2004/038548 | 5/2004 |

OTHER PUBLICATIONS

Notice of Allowance for U.S. Appl. No. 13/838,815 dated Jun. 19, 2015.

Notice of Allowance for U.S. Appl. No. 13/838,815 dated Jan. 29, 2015.

(56) References Cited

OTHER PUBLICATIONS

Notice of Allowance for U.S. Appl. No. 14/027,118 dated Feb. 4, 2016.
Notice of Allowance for U.S. Appl. No. 14/334,232 dated Nov. 10, 2015.
Notice of Allowance for U.S. Appl. No. 14/487,342 dated Sep. 23, 2015.
Notice of Allowance for U.S. Appl. No. 14/690,905 dated Nov. 23, 2015.
Notice of Allowance for U.S. Appl. No. 15/071,886 dated Apr. 26, 2018.
Official Communication for European Patent Application No. 14159447.3 dated Nov. 25, 2014.
Official Communication for European Patent Application No. 14159447.3 dated Jan. 8, 2015.
Official Communication for European Patent Application No. 15157642.8 dated Jul. 20, 2015.
Official Communication for New Zealand Patent Application No. 622501 dated Apr. 1, 2014.
Official Communication for New Zealand Patent Application No. 622501 dated Jun. 5, 2014.
Official Communication for U.S. Appl. No. 13/181,392 dated Aug. 28, 2014.
Official Communication for U.S. Appl. No. 13/831,199 dated Jun. 3, 2015.
Official Communication for U.S. Appl. No. 13/831,199 dated Oct. 6, 2015.
Official Communication for U.S. Appl. No. 13/839,026 dated Aug. 4, 2015.
Official Communication for U.S. Appl. No. 14/027,118 dated May 12, 2015.
Official Communication for U.S. Appl. No. 14/027,118 dated Sep. 16, 2015.
Official Communication for U.S. Appl. No. 14/088,251 dated Feb. 12, 2015.
Official Communication for U.S. Appl. No. 14/088,251 dated May 20, 2015.
Official Communication for U.S. Appl. No. 14/088,251 dated Aug. 26, 2015.
Official Communication for U.S. Appl. No. 14/088,251 dated Jun. 30, 2015.
Official Communication for U.S. Appl. No. 14/196,814 dated May 5, 2015.
Official Communication for U.S. Appl. No. 14/196,814 dated Oct. 7, 2015.
Official Communication for U.S. Appl. No. 14/334,232 dated Jul. 10, 2015.
Official Communication for U.S. Appl. No. 14/487,342 dated Apr. 23, 2015.
Official Communication for U.S. Appl. No. 14/580,218 dated Jan. 7, 2016.
Official Communication for U.S. Appl. No. 14/690,905 dated Oct. 7, 2015.
Official Communication for U.S. Appl. No. 15/071,886 dated Nov. 15, 2017.
Restriction Requirement for U.S. Appl. No. 13/839,026 dated Apr. 2, 2015.
Notice of Allowance for U.S. Appl. No. 16/027,813 dated Feb. 28, 2019.
Official Communication for U.S. Appl. No. 16/027,813 dated Dec. 14, 2018.
Official Communication for U.S. Appl. No. 16/027,813 dated Aug. 9, 2018.

* cited by examiner

DATABASE SYSTEMS AND USER INTERFACES FOR DYNAMIC AND INTERACTIVE MOBILE IMAGE ANALYSIS AND IDENTIFICATION

CROSS-REFERENCE TO RELATED APPLICATIONS

This application is a continuation of U.S. patent application Ser. No. 16/027,813, filed Jul. 5, 2018, entitled "DATABASE SYSTEMS AND USER INTERFACES FOR DYNAMIC AND INTERACTIVE MOBILE IMAGE ANALYSIS AND IDENTIFICATION," which is a continuation of U.S. patent application Ser. No. 15/071,886, filed Mar. 16, 2016, now U.S. Pat. No. 10,043,102, issued Aug. 7, 2018, entitled "DATABASE SYSTEMS AND USER INTERFACES FOR DYNAMIC AND INTERACTIVE MOBILE IMAGE ANALYSIS AND IDENTIFICATION," which claims the benefit of priority to U.S. Patent Application No. 62/280,867, filed Jan. 20, 2016, entitled "DATABASE SYSTEMS AND USER INTERFACES FOR DYNAMIC AND INTERACTIVE MOBILE IMAGE ANALYSIS AND IDENTIFICATION," each of which is hereby incorporated by reference herein in their entirety.

TECHNICAL FIELD

The present disclosure relates to database systems and techniques for image analysis, identification, data association, and dynamic data integration; computer systems and techniques for interactive data visualization and presentation; and communication systems and techniques for interactive data communication. More specifically, the present disclosure relates to systems, techniques, and user interfaces for integrating and associating data and images from one or more databases and from a mobile device, analyzing images captured on a mobile device, and visualizing identity information on a mobile device.

BACKGROUND

Databases of reference images and associated identification information can be a useful tool in identification of images captured in the field (e.g. by a law enforcement personnel). However, a database of possible identities may comprise a very large set of images and identification information, making it challenging to utilize such a database in the field. Furthermore, occasions present themselves when it may be necessary to ascertain the identity of an image, e.g., an image associated with a person, during a short encounter. An encounter may last no more than a few minutes and may be shorter. A person who needs to identify the image may have a mobile device with a camera. But it is impractical to store what may be a very large database in a mobile device and challenging to determine the best matches within a short amount of time.

SUMMARY

What is desirable is a database system for identification of an image in a mobile environment using image recognition. One or more databases in a system back-end can store a very large number of reference images and associated identification data. The system back-end can be configured to perform data and image integration, image analysis, and dynamic database updates. An interactive user interface may facilitate a transaction involving image search and analysis and data visualization and presentation. A transaction in the system may begin with a user capturing an image, e.g., that of a person, using a device connected to a mobile communication network. The system allows the user to transmit the captured image to a back-end portion of the system. The system back-end can perform image recognition to match the captured image against stored images in its database and determine a number of most closely matched images. The system back-end can retrieve identification information associated with the most closely matched images and transmit the most closely matched images and the associated identification information to the user's mobile device. The system may allow the user to select a match and access identification information associated with the match.

In some embodiments, the system back-end determines a number of most closely matched images based on a threshold of confidence level. The threshold of confidence level may be dynamically adjusted to change the number of closest matches transmitted to the user's mobile device.

In some embodiments, the system back-end may store visual images and/or feature sets extracted from the visual images in its database. Such extracted feature sets may be used in the determination of the most closely matched images. In some embodiments, a mobile device may extract a feature set from a captured image and transmit the extracted feature set in lieu of the captured image to the system back-end.

In some embodiments, the system may permit entry of identity information associated with a captured image via a mobile device and transmission of the identity information and the captured image to the system back-end. The system back-end can use the identity information to assist the image identification process. For example, the system back-end can determine the closest matches through matching both the captured image and associated identity information with the stored images and associated identification information in its database.

In certain embodiments, the system may permit dynamic updates to the image data and/or identification information in the system back-end database. Some embodiments may permit dynamic updates in the form of adding a captured image and/or identity information associated with a captured image to the system back-end database.

In some embodiments, the system may be configured to retain a captured image for match redetermination after the system back-end database is dynamically updated with additional image data and/or identification information. In some embodiments, the system may be configured to retain a search result for result re-presentation after the system back-end database is dynamically updated with additional identification information, and system back-end determines the additional identification information to contain what is associated with a retained search result and transmits such additional identification information to the mobile device. In some embodiments, a mobile device may store a captured image in its memory.

In some embodiments, the system may permit a plurality of captured images, those associated with one event for instance, to be used in mutual assistance in the image identification process.

In some embodiments, the system back-end may transmit identification information associated with the closest matches to a mobile device automatically, without further requests from the mobile device. In some other embodiments, the system back-end may transmit only a portion of identification information associated with the closest matches to a mobile device, and transmit additional portions of identification information associated with the closest matches to a mobile device upon further request or requests from the mobile device.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to operations comprising one or more aspects of the above-described embodiments (including one or more aspects of the appended claims).

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, non-transitory computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

BRIEF DESCRIPTION OF THE DRAWINGS

Throughout the drawings, reference numbers, if re-used, indicate correspondence between referenced elements. The drawings are provided to illustrate embodiments of the inventive subject matter described herein and not to limit the scope thereof.

DETAILED DESCRIPTION

Figure 1:
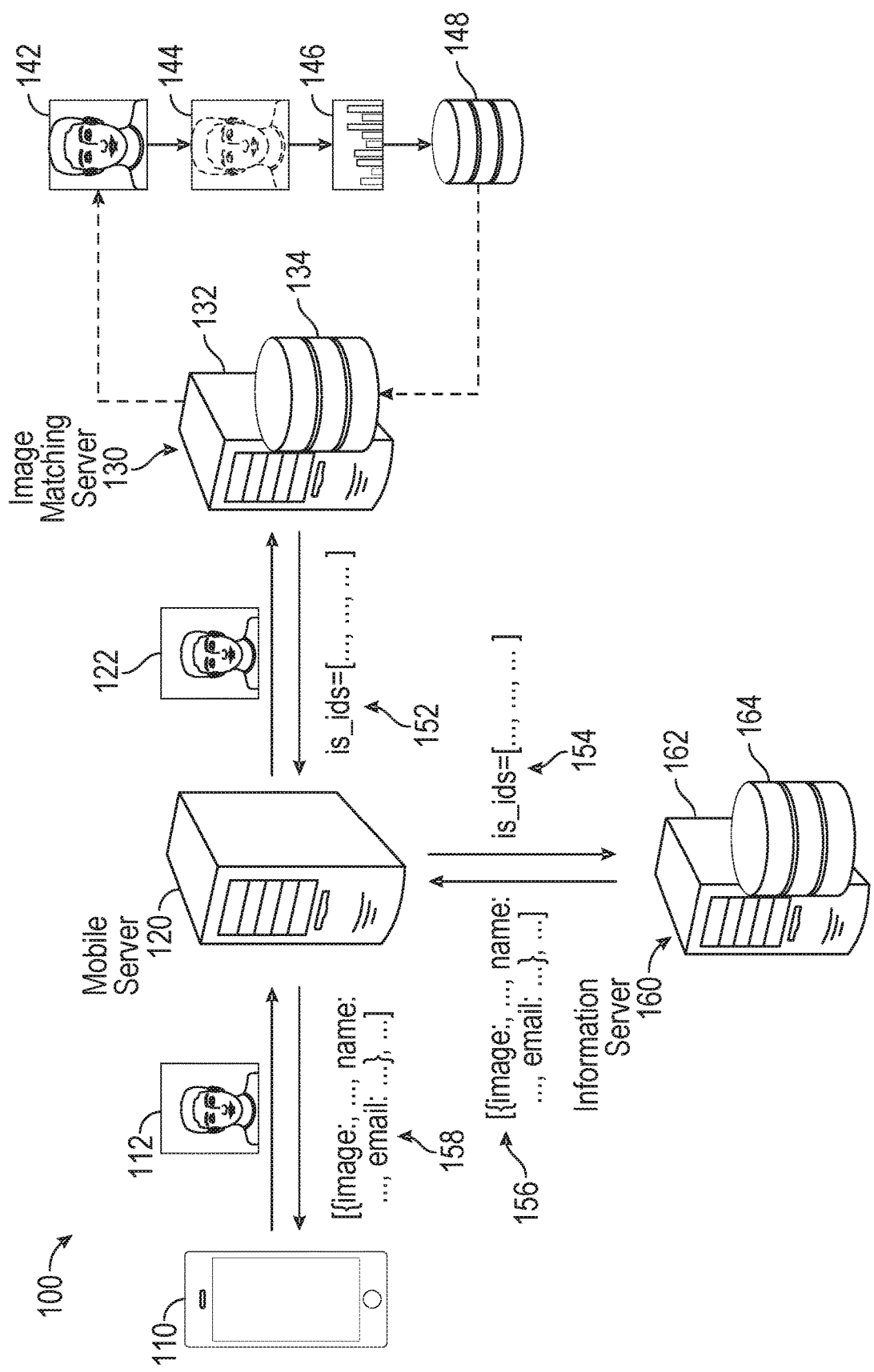
FIG. 1 illustrates a schematic diagram of an example system for identifying images captured using a mobile device.

The headings provided herein, if any, are for convenience only and do not necessarily affect the scope or meaning of the claimed invention.

Overview

Embodiments of the present disclosure relate to systems, methods, and computer-readable mediums for identifying an image captured using a mobile device and displaying identity information associated with the captured image. A system obtains an image captured using a camera on a mobile device and performs image analysis to identify the captured image using reference images in a database. The system can present the results for display an interactive user interface.

As mentioned above, the present disclosure, according to various embodiments, describes a database system for identification of an image in a mobile environment using image recognition. One or more databases in a system back-end can store a very large number of reference images and associated identification data. The system back-end can be configured to perform data and image integration, image analysis, and dynamic database updates. An interactive user interface may facilitate a transaction involving image search and analysis and data visualization and presentation. A transaction in the system may begin with a user capturing an image, e.g., that of a person, using a device connected to a mobile communication network. The system allows the user to transmit the captured image to a back-end portion of the system. The system back-end can perform image recognition to match the captured image against stored images in its database and determine a number of most closely matched images. The system back-end can retrieve identification information associated with the most closely matched images and transmit the most closely matched images and the associated identification information to the user's mobile device. The system may allow the user to select a match and access identification information associated with the match.

In various embodiments of the present disclosure, large amounts of data are automatically and dynamically processed in response to user inputs, and the processed data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide faster and more accurate image identification for a user in a mobile environment. For example, user interactions with the interactive user interfaces described herein may provide an optimized display of time-varying report-related information and may enable a user to more quickly access, navigate, assess, and digest such information than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. Additionally, various embodiments of the present disclosure are inextricably tied to computer technology. In particular, a mobile device and a complex computing system in communication with each other are key components in various embodiments. In addition, some embodiments rely on detection of user inputs via graphical user interfaces, calculation of updates to displayed electronic data based on those user inputs, processing of related data objects, and presentation of the updates to displayed results via interactive graphical user interfaces. Such features and others are intimately tied to, and enabled by, computer and communication technologies, and would not exist except for these technologies. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic image data.

Terms

In order to facilitate an understanding of the systems and methods discussed herein, a number of terms are defined below. The terms defined below, as well as other terms used herein, should be construed to include the provided definitions, the ordinary and customary meanings of the terms, and/or any other implied meanings for the respective terms. Thus, the definitions below do not limit the meanings of these terms, but only provide exemplary definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (Oracle database, mySQL database, etc.), non-relational databases (for example, a NoSQL database), an in-memory database, spreadsheets, XML files, and text file, among others. The various terms "database," "storage," "data store," and "data source" may be used interchangeably in the present disclosure.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Example System

FIG. 1 illustrates a schematic diagram of an example system according to the present disclosure. The system includes four components: a mobile device 110, a mobile server 120, an image matching server 130, and an information server 160. The mobile server 120, the image matching server 130, and the information server 160 may be collectively referred to as the system back end.

A user mobile device 110 includes a camera for capturing images and a communication component for communicating over a mobile network. The mobile device 110 can be used to capture an image 112, for example a mug shot. The mobile device 110 can transmit the image 112 to a mobile server 120 via the mobile network. The mobile server 120 can transmit the image 122 to an image matching server 130. In some embodiments, the mobile server 120 may be configured to receive different types of messages from the mobile device 110. In such embodiments, the mobile server 120 may be further configured to forward only certain types of messages, e.g. image identification messages, to the image matching server 130 and forward other types of messages to other servers.

The mobile device 110 may embed image 112 in a task object using a method disclosed in U.S. patent application Ser. No. 14/196,814, filed Mar. 4, 2014, and titled "MOBILE TASKS," the entire disclosure of which is hereby made part of this specification as if set forth fully herein and incorporated by reference for all purposes, for all that it contains.

Communications between a mobile device 110 and the system back end may be performed using a method disclosed in U.S. patent application Ser. No. 13/831,199, filed Mar. 14, 2013, and titled "MOBILE REPORTS," the entire disclosure of which is hereby made part of this specification as if set forth fully herein and incorporated by reference for all purposes, for all that it contains.

User accounts in the system through a mobile device 110 may be created and/or configured using a method disclosed in U.S. patent application Ser. No. 13/839,026, filed Mar. 15, 2013, and titled "USE OF TEAMS IN A MOBILE APPLICATION," the entire disclosure of which is hereby made part of this specification as if set forth fully herein and incorporated by reference for all purposes, for all that it contains.

Where the mobile communication channel may be only periodically available, unreliable, or non-existent, the communication between the mobile device 110 and the system back end may be facilitated using a method disclosed in U.S. patent application Ser. No. 14/334,232, filed Jul. 17, 2014, and titled "MANAGING DISCONNECTED INVESTIGATIONS," the entire disclosure of which is hereby made part of this specification as if set forth fully herein and incorporated by reference for all purposes, for all that it contains.

A processor 132 in the image matching server 130 can analyze the image 122 to find one or more most closely matched images from its database 134. A database 134 may contain reference images and/or feature sets extracted from reference images. A reference image and an associated feature set, if any, may correspond to one information server ID (is_id) 152. The extracted feature sets, if any, may be extracted from images of similar or standard size and/or alignment. The image matching server 130 may be implemented as a plurality of servers or processors; and a distributed search algorithm may be implemented to reduce the search time. Features may be extracted from references images as described below.

Objects and/or properties in the database 134 may be generated using a method disclosed in U.S. Pat. No. 9,123,086, issued Sep. 1, 2015, and titled "AUTOMATICALLY GENERATING EVENT OBJECTS FROM IMAGES," the entire disclosure of which is hereby made part of this specification as if set forth fully herein and incorporated by reference for all purposes, for all that it contains.

The identification of the closest matches and association of the search request and the closest matches may be performed using a method disclosed in the aforementioned U.S. patent application Ser. No. 14/196,814 titled "MOBILE TASKS."

The database 134 may contain dynamic data, e.g., the reference images residing therein may be updated automatically, periodically, regularly, on demand (e.g., by user request), or otherwise. Where a database 134 contains dynamic data, the system may be configured to retain certain searches (e.g., recent searches, searches tagged active, searches which did not return a good match, etc.) to continue searching as new reference images are added to the database 134, and to provide updated search results, if any, to a user.

Feature Extraction

The incoming image 122 may be analyzed by the image matching server 130. In one implementation, incoming image 122 is analyzed generally as follows: (1) image 122, if in color, may be converted to grayscale; (2) the image can be enhanced through histogram equalization; (3) the image can be further enhanced through Tan-Triggs preprocessing; (4) image normalization (e.g. scaling) and/or alignment may be performed, resulting in a normalized and/or aligned grayscale image 144; (5) object detection may be performed on the resulting image, for example, detecting an object such as a face; and (6) feature extraction can be performed on the image 144, resulting in a feature set 146. The components in the analysis and some advantages they provide are further described below.

The conversion to grayscale removes and/or reduces information which may not be useful to object detection and/or feature extraction, e.g., information associated with color. In some implementations, conversion to grayscale may be performed on the computing device 110, and may advantageously speed up image matching as less bandwidth is consumed when sending the image to the image matching server 130 (thereby reducing the time needed to transmit the image). Further, in some implementations, conversion to grayscale may decrease processing power needed to process the image as color data associated with the image may not need to be processed. Feature extraction may also be improved by conversion to grayscale, for example, in implementations in which color is not a key image feature, or likely to help in matching images.

Histogram equalization can enhance contrast within an image. A higher contrast can facilitate object detection. Tan-Triggs preprocessing can reduce the influence of variation in illumination. Variation in illumination may be pronounced in an image 122 which is typically taken under uncontrolled lighting conditions. Tan-Triggs preprocessing is based on gamma correction, difference of Gaussian filtering, and robust variance normalization. Tan-Triggs preprocessing can substantially improve the robustness of certain linear subspace methods and of Local Binary Patterns (LBP). Normalization and/or alignment may transform the image to a standard size and/or position within the frame to be analyzed, such as the size and/or position used to generate the database 134 of reference feature sets. Alignment may be based on, for example, alignment of eyes in a facial image or alignment of shoulders in an upper-body image. A feature set 146, also known as a feature descriptor, corresponding to an image can be an array of values. Components in a feature set 146 may be a representation of the prominence of particular features of the image. Feature extraction may involve a local phase quantization technique to resolve blurry images, which may occur frequently among images captured by a mobile device 110. For example, urgency of the situation under which an image is captured, movement of a subject whose image is captured, or movement of a user capturing an image can be factors contributing toward a blurry captured image. Thus, the local phase quantization technique can be advantageous in a mobile image capture system in reducing blurriness in images.

The extracted features can be stored in the database 148. The database 148 may be integrated with database 134. The feature extraction may be done through the use of binary patterns stored in the image matching server 130.

In other implementations, an incoming image 122 is analyzed according to other processes, or variations on the implementation described above. For example, in some implementations the image 122 is not converted to grayscale prior to other processing, or is converted to grayscale after other processing. In another example implementation, a contrast-limited adaptive histogram equalization may be used instead of histogram equalization. Contrast-limited adaptive histogram equalization operates on a small image region rather than an entire image. In yet another example implementation, a technique such as wavelet transform may be used to detect a blurry image; the local phase quantization technique is only applied to images determined to be blurry. Another implementation may represent a feature set as a matrix instead of an array. Some implementations may include a number of feature extraction computation sets, one set for each type of images, for example, facial images of human beings, landscape images, images of buildings or vehicles, etc. In these implementations, a captured image can be analyzed for type classification. A set of feature extraction computations can then be selected based on the classification and applied to the captured image. Additional algorithms are described below in connection with FIG. 11. Other implementations may employ yet different variations. The examples provided are for illustration and not for limitation.

Image Matching

The extracted feature set may be compared against the reference feature sets in database 134 for image matching. The image matching server 130 may find one or more stored reference images and/or feature sets which closely match image 122 or its extracted feature set 146.

The "closeness" between two images can be evaluated through their corresponding feature sets. For example, feature sets represented as arrays can be evaluated for closeness using distance between the arrays, e.g., determination based on nearest neighbor. In one implementation, image matching may be performed as follows: (1) an array representing a feature set 146 is received; (2) a reference array representing a reference feature set is retrieved from database 134; (3) a distance between the received array and the reference array is computed; (4) the computed distance is compared against a threshold; (5) if the distance is smaller than the threshold, the reference image associated with the reference feature set is flagged as a close match; (6) if the distance is not smaller than the threshold, the reference image associated with the reference feature set is discarded (for the purpose of the present search) as not a close match; (7) repeat from (2) with another reference image until all available or target reference images have been evaluated.

A distance between two arrays can be measured in a number of ways, e.g. chi-square distance, Euclidian distance, etc. Image matching in other implementations may involve a different process or different components. For example, image matching may use a support vector machine to classify matches, wherein a hyperplane separates matches from non-matches. Some implementations may compute feature sets of reference images during the image matching process using the same computations involved in generating the feature set of captured image. The feature extraction computations can be tailored based on the captured image, e.g., the best set of computations to produce a feature set for a particular captured image. This can be advantageous since captured images may have a wide range of qualities or attributes with which a fixed set of feature extraction computations may not work well. In implementations including a number of feature extraction computation sets, one set for each type of images as described above, reference feature sets of reference images can be pre-generated based on the type of the reference images. Other implementations may employ yet different variations. The examples provided are for illustration and not for limitation.

The image matching server 130 may be configured to return a certain number of closest matches, the closest matches (regardless of number) which meet and/or exceed a threshold of confidence level, a certain number of closest matches which meet and/or exceed a threshold of confidence level, or the closest matches based on other criteria. The image matching server 130 may also be configured to return all matches, e.g., identified through a support vector machine. A confidence level can represent the degree of match. A threshold used in image matching may be automatically and dynamically adjusted by the system or interactively and dynamically by a user to increase or decrease the number of closest matches returned to the mobile device 110. In any event, the image match server 130 can return the information server IDs (is_ids) 152 associated with the closest matches, if any, to the mobile server 120. The mobile server can then relay the is_ids 154 to the information server 160. The is_ids 152/154 may be an object ID associated with an object as discussed below in connection with object centric data model.

The information server 160 includes a processor 162 and a database 164. The database 164 may be configured to store identity/identification information associated with reference images stored in the image matching server database 134. An update to database may be to one or both databases 134 and 164 at a time. For example, an image may be added to the set of reference images in database 134, and identity information associated with the added image may be added to database 164 at the same time or in the same transaction. As a counterexample, identity information associated with an existing information server ID 152 may be added to database 164 without updating the reference image database 134.

Like database 134, the database 164 may contain dynamic data, e.g. the identity information residing therein may be updated periodically, regularly, on demand (e.g. by user request), or otherwise. Where a database 164 contains dynamic data, the system may be configured to retain certain searches (e.g. recent searches, searches tagged as active, etc.) to send updated identity information to the mobile device as new identity information are added to the database 164.

Objects and/or properties in the database 164 and links to objects and/or properties in the database 134 may be generated using a method disclosed in aforementioned U.S. Pat. No. 9,123,086 titled "AUTOMATICALLY GENERATING EVENT OBJECTS FROM IMAGES."

Upon receiving is_ids 154, the information server 160 may retrieve the identity information associated with each is_id 154 from its database 164. The information server 160 can then return the identity information 156 to the mobile server 120. The identity information 156 returned by the information server 160 may or may not include is_ids 154. The mobile server 120 can send the identity information 158 to the mobile device 110. Identity information 158 may be identical to or a subset of identity information 156. The mobile device 110 can be configured to display the identity information 158 or a subset thereof. Alternatively (not shown), the information server 160 and/or the mobile server 120 can be configured to send only a subset of identity information associated with the closest matches, and to send additional identity information associated with any one or more of the closest matches upon request from the mobile device 110. This may be advantageous if the size of the identity information is large and/or the communication channel between the mobile device and the system back end is slow.

The communication channel between the mobile server 120 and the image matching server 130 may be implemented in one or more of a number of schemes. Examples of such schemes are provided below in connection of the description of communication interface 418 in FIG. 4. Likewise, the communication channel between the mobile server 120 and the mobile device 110 may be implemented in one or more of a number of schemes. Such schemes are usually those which permit the mobile device 110 to maintain its mobility. A cellular network may be typical. However, a Wi-Fi network may permit mobility of the mobile device 110 in certain situations, for example, when the mobile device 110 operates within a building within the coverage area of a Wi-Fi network. Furthermore, the mobile device 110 and/or the mobile server 120 may choose a communication channel over which to communicate. This choice may be dynamic. For example, the mobile device 110 and/or the mobile server 120 may choose to communicate over a Wi-Fi network when the mobile device 110 is within the coverage area of a Wi-Fi network, and switch to a cellular network when the mobile device leaves the coverage area.

The mobile server 120, the image matching server 130, and the information server 160 may be implemented as three distinct servers as illustrated. However, other implementation choices are possible. For example, the three servers may be implemented in one. As another example, the image matching server 130 and the information server 160 may be implemented together in one platform, and the mobile server 120 implemented in another platform. There may be a number of considerations which could affect the choice of implementation, for example, efficiency of the system, cost and/or availability of servers at a certain performance level, security of the system, etc. The concept and the system data flows illustrated in FIG. 1, however, may not affected significantly by the particular choice of implementation.

While a mug shot is used to illustrate the system operation in FIG. 1, an embodiment is not limited to only processing facial images of persons. Other types of images are possible. For example, a tattoo image may be used to identify a person with whom the tattoo pattern is associated. As another example, an image of a scene may be used to identify its location. Indeed, there appears to be no technical limit to the types of images that could be processed by the system.

Furthermore, the image 112 transmitted to the mobile server 120 needs not be the raw image captured by the mobile device 110. The mobile device 110 may be configured to preprocess the raw image capture. For example, the raw image can be normalized to a certain image size and/or converted to grayscale prior to transmission. As another example, the raw image can be compressed to meet a certain file size threshold prior to transmission. The file size threshold may be dependent upon the throughput of the communication channel between the mobile device 110 and the mobile server 120. In some implementations, the mobile device can perform feature extraction of the image and transmit the feature set data instead of the image. This may be beneficial where a mobile device has adequate processing power and the transmission throughput between the mobile device and a system back end is limited. Similarly, the image 122 transmitted to the image matching server 130 needs not be unaltered from the image 112 received from the mobile device. The examples above of preprocessing an image at the mobile device 110 may be done at the mobile server 120.

In an embodiment, a mobile device may be configured to retain a capture image for later use. This may be desirable, for example, if the mobile device is not operatively connected to a communication network at the time of image capture.

The image matching server 130 and/or information server 160 may store information in their databases 134 and 164 using an object centric data model such as the one described below. For example, an is_id may be a data object; image, name, email address, etc. may be properties associated with the is_id data object.

The object centric data model enables additional search capabilities. These additional search capabilities may be better understood with the descriptions of object centric data model below but are illustrated at this point because of their relation to the system schematic FIG. 1. For example, where images of more than one person are captured and processed through the system in connection with a single encounter, the links or link sets among data objects provided in the object centric data model may provide an increased confidence in certain matches. To illustrate, consider a scenario where images of a man and a woman in one car are both processed through the system in connection with a traffic stop. If the image matching analysis returns two matches for the man's image, one at 80% confidence level and the other at 70%, and the image matching analysis also returns two matches for the woman's image, one at 80% confidence level and the other at 70%, and if a link or a link set exists only between the two matches at 70% confidence level and not between any other combinations, the system may assign a higher confidence level (e.g., over 80%) to the two matches originally at 70% confidence level. As another illustration, consider the same traffic stop scenario. If the image matching analysis returns one match for the man's image and two matches for the woman's image, one at 60% confidence level and the other at 50%, and if a link or a link set exists only between the match for the man's image and the match for the woman image at 50% confidence level, the system may assign a higher confidence level (e.g., over 60%) to the match for the woman's image originally at 50% confidence level. In a similar illustration, the system may be used to capture a facial image of a person as well as a tattoo on the person's body. The tattoo image may be used to increase the confidence level of a facial image match where a link or a link set exists between the facial image match and a tattoo image match. As another illustration of an additional search capability which can be enabled through the object centric data model, consider a scenario where a mobile image of a person and an additional parameter of male gender are sent from a mobile device (e.g., as described in connection with FIG. 7 below). If the image matching analysis generates five close matches but two of the five are associated with a female identity in associated object data, the system can exclude the two and transmit only information associated with the three close male matches to the mobile device. Any data type associated with reference images stored in the information server 160 can be a useful parameter type to provide from a mobile device along with an image.

Object Centric Data Model

To provide a framework for the following discussion of specific systems and methods described herein, an example database system 210 using an ontology 205 will now be described. This description is provided for the purpose of providing an example and is not intended to limit the techniques to the example data model, the example database system, or use of an ontology by the example database system to represent information.

In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

Figure 2:
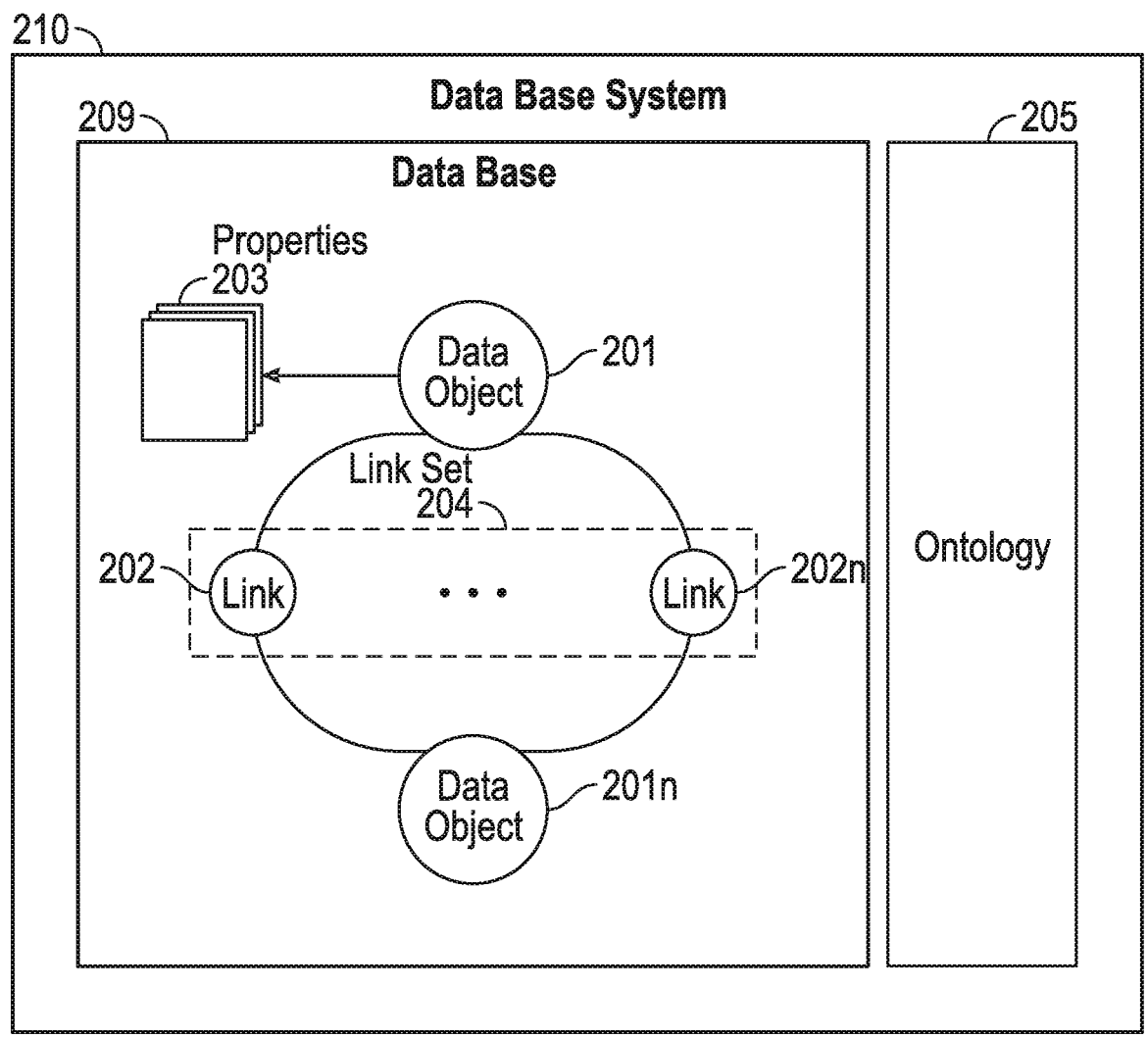
FIG. 2 illustrates one embodiment of a database system using an ontology.

FIG. 2 illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 205 used by the database 209.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on Mar. 27, 2009 (e.g., a property of type "date") may be stored in the database 209 as an event object with associated currency and date properties as defined within the ontology 205.

The data objects defined in the ontology 205 may support property multiplicity. In particular, a data object 201 may be allowed to have more than one property 203 of the same property type. For example, a "Person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link. Other types of connections may be represented; embodiments are not limited to any particular types of connections between data objects. For example, a document might contain references to two different objects. As another example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Figure 3:
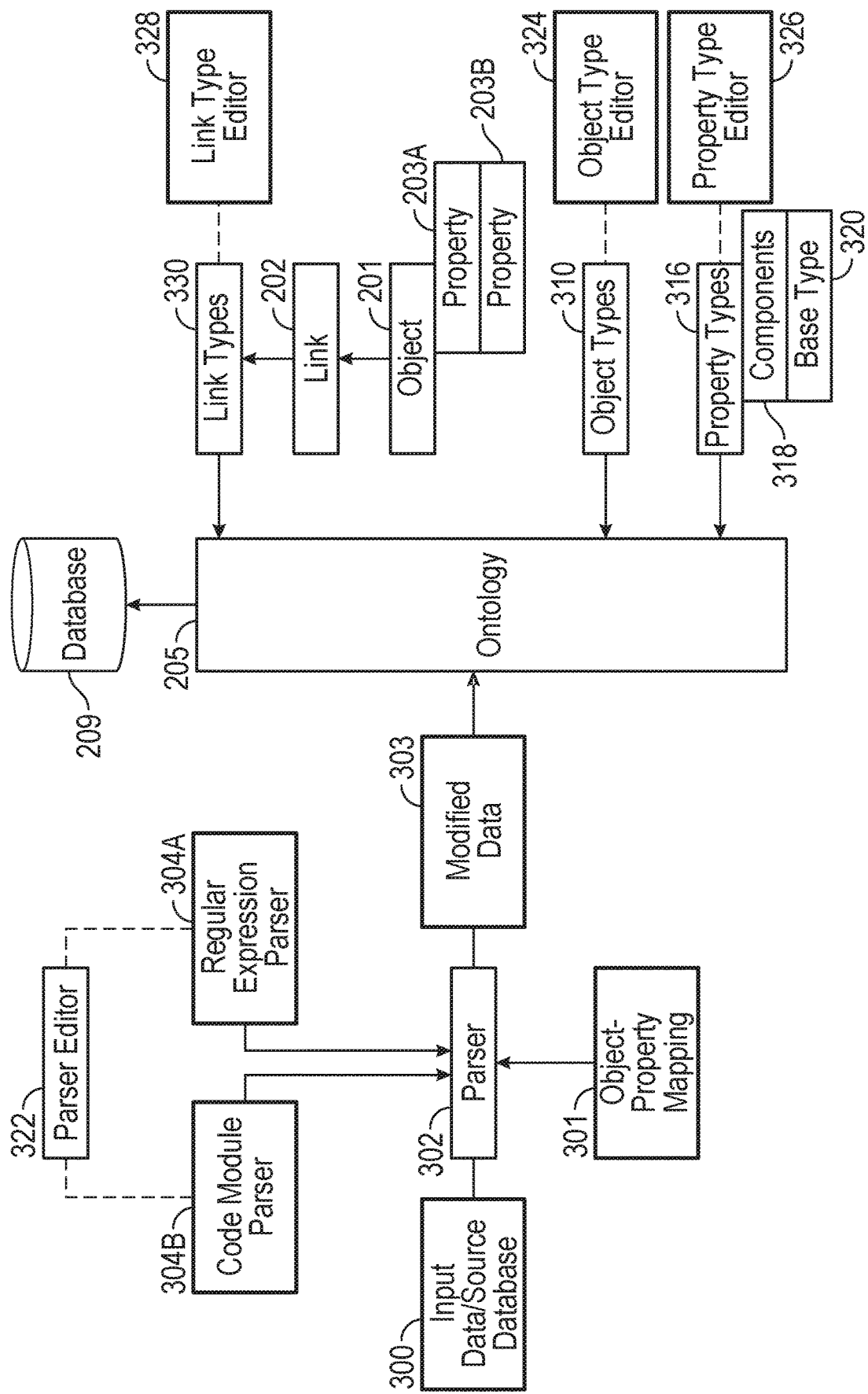
FIG. 3 illustrates one embodiment of a system for creating data in a data store using a dynamic ontology.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 302 is able to read a variety of source input data types and determine which type of data it is reading.

In accordance with the discussion above, the example ontology 205 comprises stored information providing the data model of data stored in database 209, and the ontology is defined by one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203 that are instantiated based on property types 316. Two data objects 201 may be connected by one or more links 202 that may be instantiated based on link types 330. The property types 316 each may comprise one or more components or data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 326 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 to determine which object type 310 should receive data from a record created from the input data, and which property types 316 should be assigned to data from individual field values in the input data. Based on the object-property mapping 301, the parser 302 selects one of the parser definitions that is associated with a property type in the input data. The parser parses an input data field using the selected parser definition, resulting in creating new or modified data 303. The new or modified data 303 is added to the database 209 according to ontology 205 by storing values of the new or modified data in a property of the specified property type. As a result, input data 300 having varying format or syntax can be created in database 209. The ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

Relationships between data objects may be stored as links, or in some embodiments, as properties, where a relationship may be detected between the properties. In some cases the links may be directional. For example, a payment link may have a direction associated with the payment, where one person object is a receiver of a payment, and another person object is the payer of payment.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows 10, Windows Server, Windows CE, Unix, Linux, SunOS, Solaris, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 4:
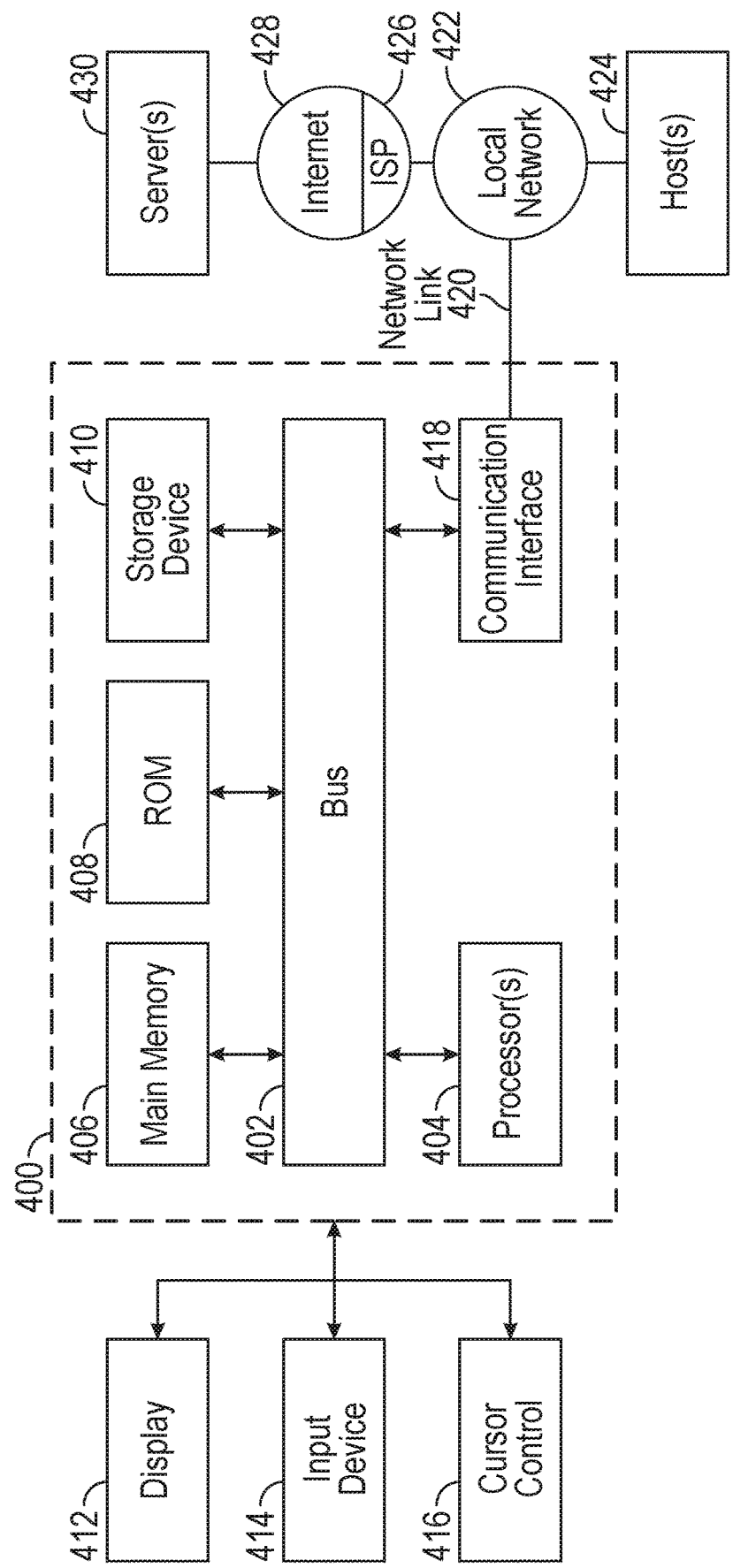
FIG. 4 illustrates a computer system with which certain methods discussed herein may be implemented.

FIG. 4 is a block diagram that illustrates a computer system 400 upon which an embodiment may be implemented. Computer system 400 includes a bus 402 or other communication mechanism for communicating information, and a hardware processor, or multiple processors, 404 coupled with bus 402 for processing information. Hardware processor(s) 404 may be, for example, one or more general purpose microprocessors.

Computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

Computer system 400 may be coupled via bus 402 to a display 412, such as a cathode ray tube (CRT) or LCD display (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression and/or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 402. Transmission media can also take the form of acoustic, electromagnetic, or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may retrieve and execute the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN (or WAN component to communicated with a WAN). Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send and receive messages and/or data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Each of the processes, methods, and algorithms described in the preceding and/or following sections may be embodied in, and fully or partially automated by, code modules executed by one or more computer systems or computer processors comprising computer hardware. The processes and algorithms may be implemented partially or wholly in application-specific circuitry.

Example Image Capture Screen

Figure 5:
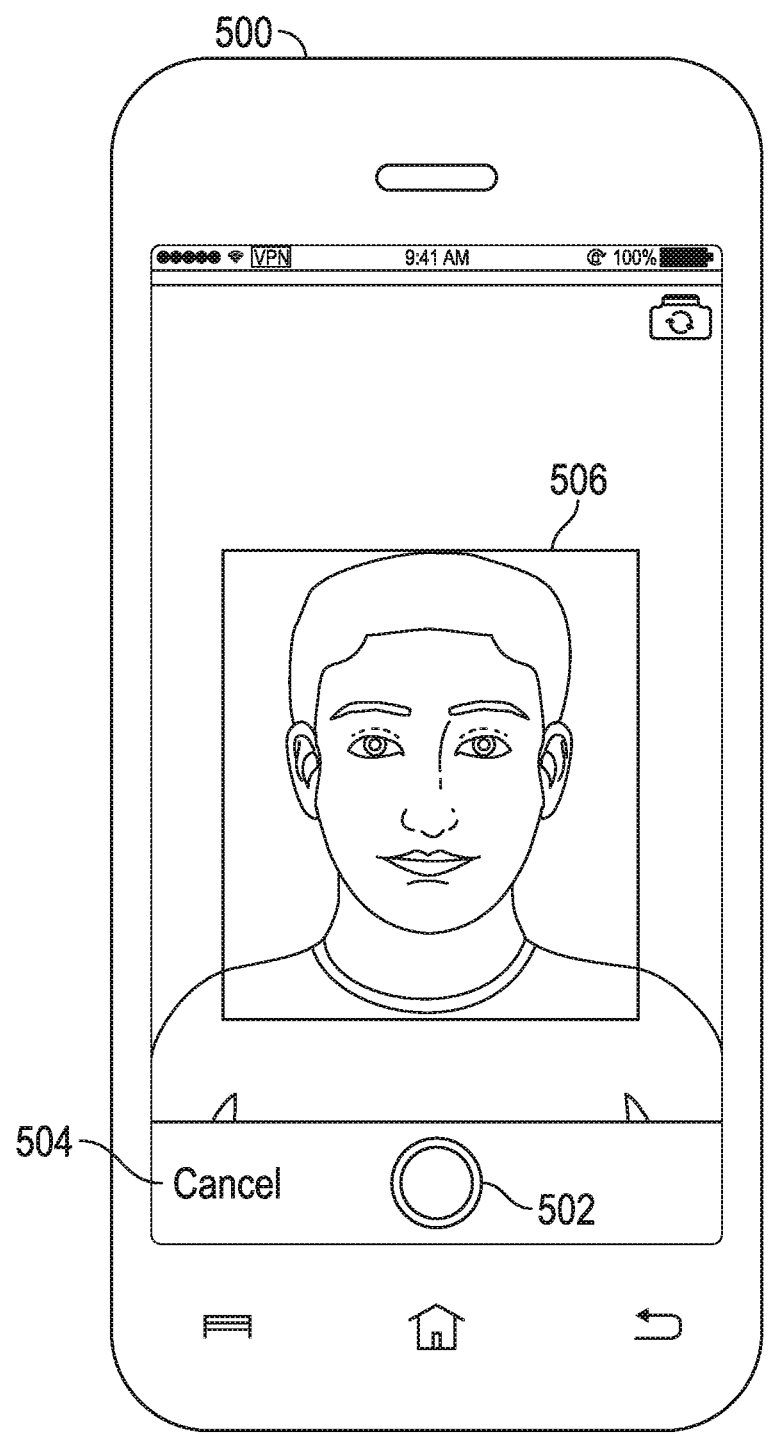
FIG. 5 illustrates an example graphical user interface (GUI) to assist image capture.

FIG. 5 illustrates an example image capture screen 500 which may be implemented on the mobile device 110. The concentric circles 502 denote a button which when pressed (or tapped or otherwise activated) instructs a camera of the mobile device 110 to capture an image. The Cancel text box, when pressed (or tapped or otherwise activated), may cancel an image capture session. A rectangular box 506 may appear on the screen to show that a recognizable image is on the screen, or to denote a desired image size and/or position to capture. The desired image size may be based on, for example, the standard size and/or alignment of reference images in the database 134. Instead of drawing a rectangular box 506, the GUI may provide an outline based on the image to be captured. For example, when capturing a facial image, the GUI may provide an outline of a head and perhaps also of the shoulders. Similar to the above description, the outline may denote the desired image size and position to capture, e.g. size and/or position similar to those for reference images in the database 134. Capturing an image close in size and/or alignment to the size and/or alignment used in reference images can be beneficial in reducing the amount of information loss associated with scaling and/or aligning a captured image, such as scaling and/or aligning described above in connection with the feature extraction process.

The screen may not be a touch screen, which is shown in the illustration. If the screen is not a touch screen, the functions 502 and 504 may be provided through keypad buttons, for example.

Example Image Usage Screen

Figure 6:
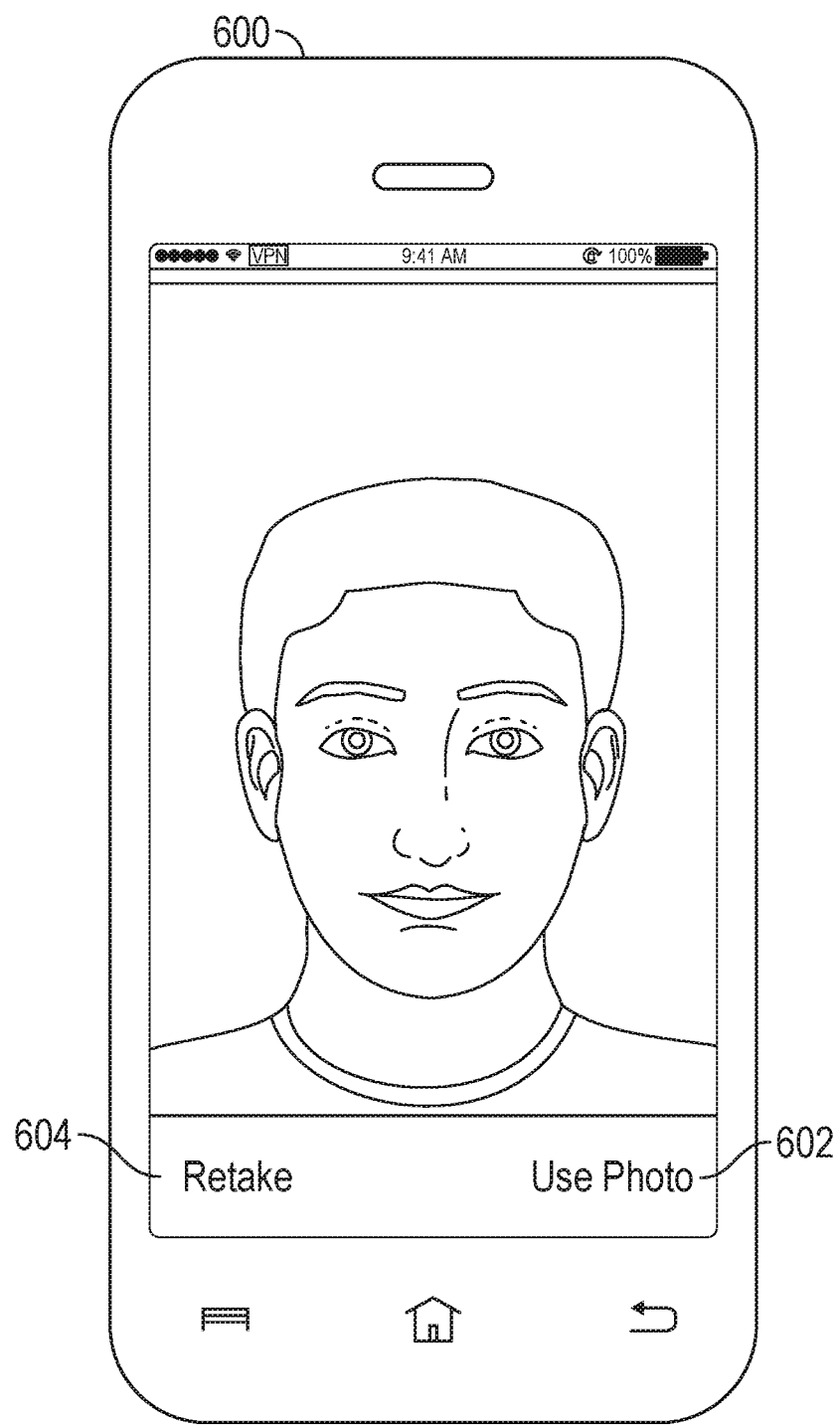
FIG. 6 illustrates an example GUI to assist image usage.

FIG. 6 illustrates an example image usage screen 600 which may be implemented on the mobile device 110. In operation, this GUI display may follow the example image capture screen 500. After a camera shot is taken, the image usage screen 600 may be displayed. The screen can display the captured image. The user may inspect the captured image and decide whether to use the captured image (by activating Use Photo text block 602), or to retake an image (by activating Retake text block 604). Alternatively, the mobile device 110 may be configured to determine whether to use the captured image. This can be done, for example, by examining the alignment and distance between the eyes of a facial image. This determination process may take place while this image usage screen 600 is displayed. The system may also cooperate with the user, for example, by running the determination process on the mobile device 110, and recommend the user to select either Use Photo 602 or Retake 604 based on the determination. The user may choose to follow or reject the system's recommendation. Providing feedback to a user as to the quality of a captured image can improve the likelihood that an image 122 transmitted to the image matching server 130 can produce good matches with reference images.

The system, e.g., the mobile device 110, may be additionally configured to retain one or more images that have already been captured when the user or the system select Retake 604 or before the user provides an indication that certain captured images are no longer needed. This can ensure that if a retaken image has worse quality than one of the earlier captures, and/or if opportunity to retake an image is no longer present, the system would have at least one image (albeit perhaps not at a desired quality) to process or analyze.

Example Search Initiation Screen

Figure 7:
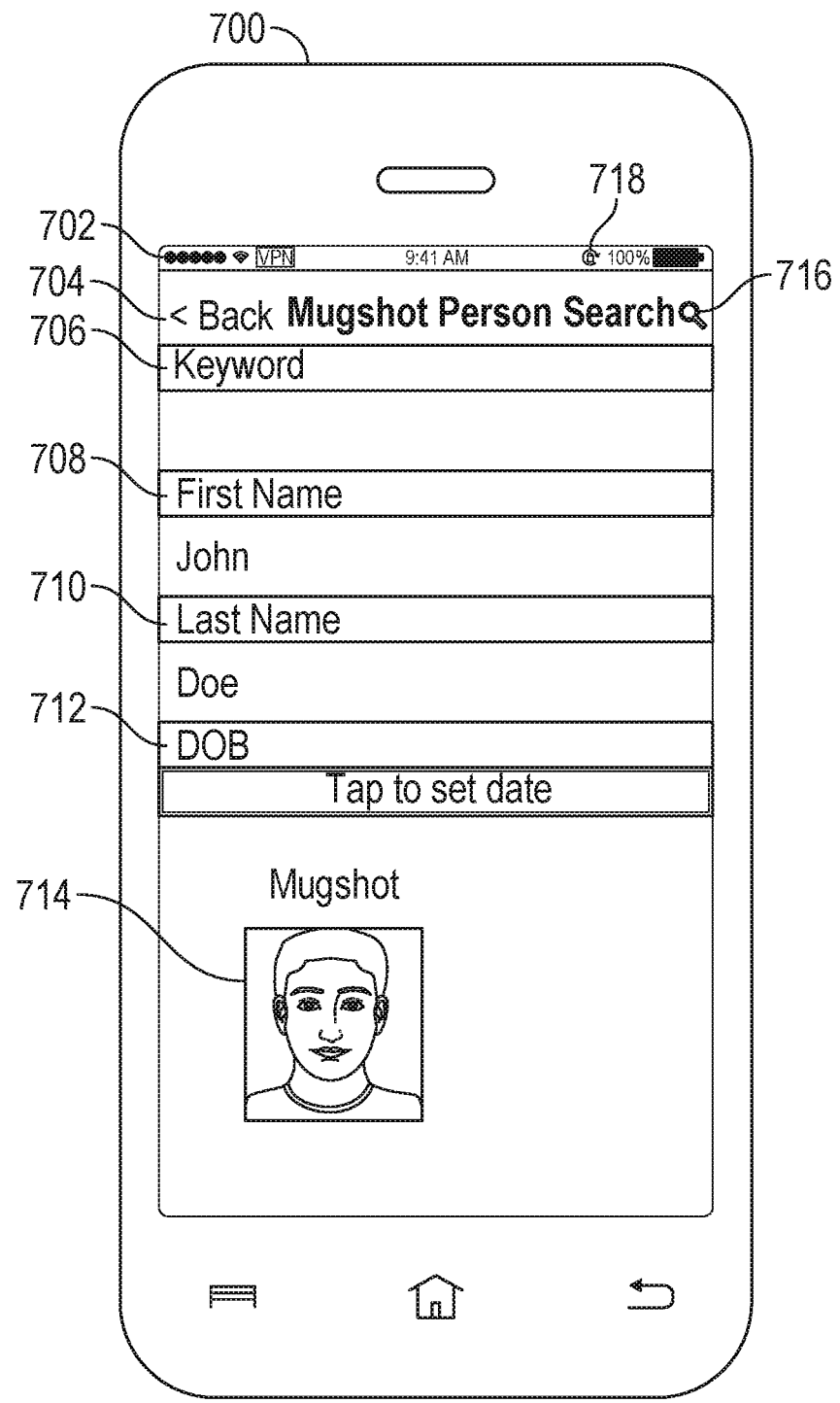
FIG. 7 illustrates an example GUI to initiate a search.

FIG. 7 illustrates an example search initiation screen 700 which may be implemented on the mobile device 110. In operation, this GUI display may follow the example image usage screen 600 or the example image capture screen 500. After an image is selected to be transmitted to the back end of the system, e.g., the mobile server 120, the search initiation screen 700 permits a user to enter additional parameters, if desired or available. The mobile device 110 may be configured to permit different methods for entering the parameters, e.g., an alphanumerical keypad, a calendar display, a scroll display, etc. A user may enter any combination of parameters such as, in the illustration, keyword 706, first name 708, last name 710, and date of birth 712. The screen may display the captured image to be transmitted 714. The title of the screen (shown as "Mugshot Person Search") may be modified based on the type of image captured or to be captured.

A communication channel status display 702 may display the types of communication channels available for communication with the system back end, e.g., the mobile server 120. Such communication channels may include, for example, a cellular network, a Wi-Fi network, etc. The communication channel display 702 may also display the strength of available communication channels using, for example, the number of filled circles or the number of curved bars. The communication channel display 702 may also indicate the security status of a communication channel, such as whether the communication channel is protected through a virtual private network (VPN). The security status of a communication channel may also be additionally displayed via, for example, an encryption on/off display 718. The magnifying glass icon 716 may be used to initiate a search. The Back text box 704 may be used to cancel a search.

The parameters such as 706 through 712 may be tailored based on the type of image captured or to be captured. For example, a keyword field 706 may be appropriate for a variety of image types, e.g. persons, houses, etc. Name and date or birth may be appropriate for image capture of persons. A location field (e.g. left arm, right thigh, etc.) may be appropriate for a tattoo image. The display on the screen 700 may be a customizable form that can be configured to include different fields in different embodiments. For example, an embodiment can provide parameter types or categories on screen 700 based on the types of data associated with reference images stored in the information server 160, because information of such data types can enable additional search capability as discussed above in connection with FIG. 1.

The system may also be configured to support a search with parameters only and without a captured image. For example, a search may be initiated by entering a name and perhaps a date of birth (or any other parameters). The system can then perform a search without image analysis, but simply return image and identity information which may match the parameters entered.

Example Search Results Screen

Figure 8:
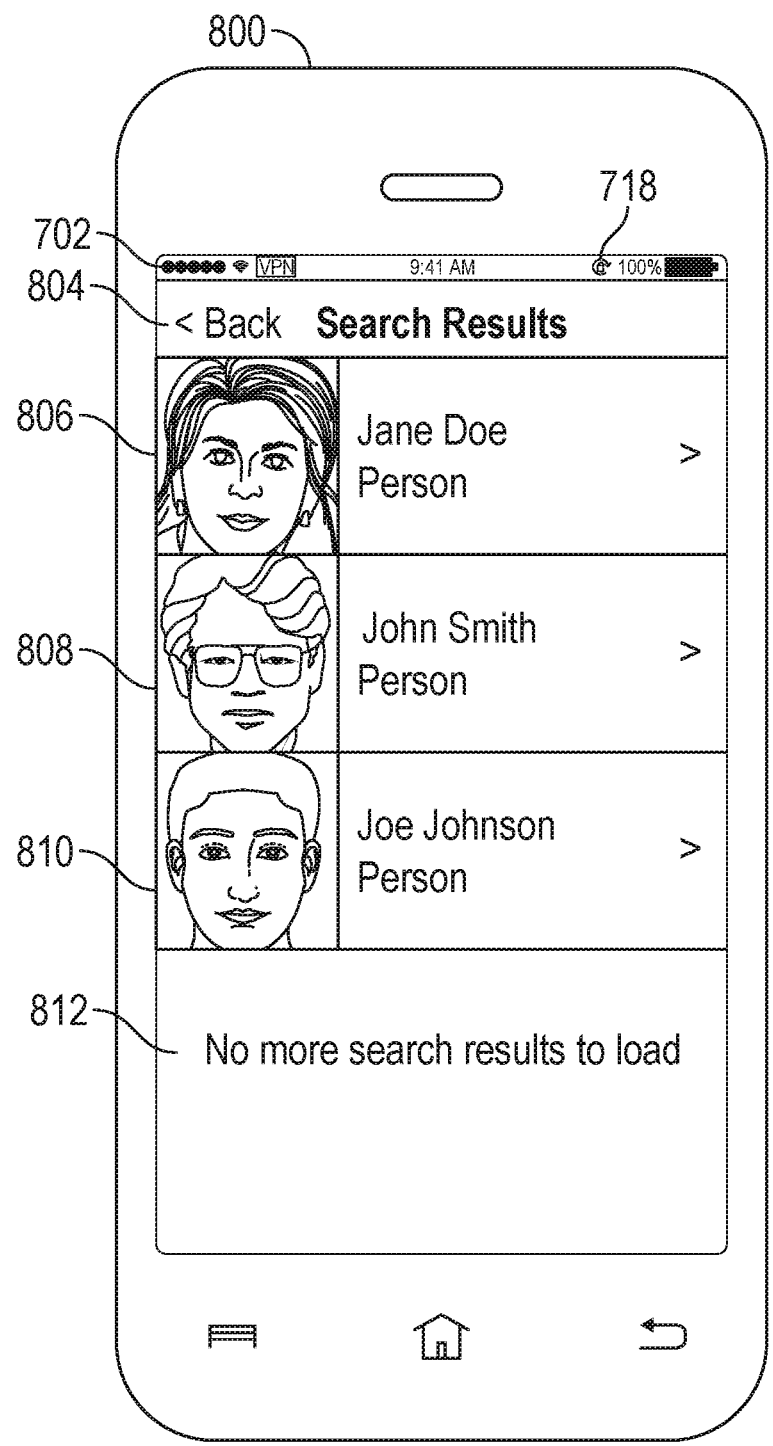
FIG. 8 illustrates an example GUI to present search results.

FIG. 8 shows an example search results screen 800 which may be implemented on the mobile device 110. In operation, this screen may be displayed after the system back end returns search results to the mobile device 110. The results may be displayed as a presentation of the images and key parameter(s) of the closest matches as shown in 806-810. A key parameter may be a data object type, e.g. a person, as described in the Object Centric Data Model section above. For example, in a person search using facial images, the facial images of the top matches from the database 134 may be displayed. This reference image from the database (e.g. the image in 810) may likely be different from the captured image 112 even when an exact match is found.

The number of results displayed may depend on the number of matches found. This number may be adjusted, as discussed above in connection with image matching, by configuring the system to return a certain number of results or to return results at or above a certain confidence level, for instance. A text display 812 may be used to indicate whether there are more results to display and, additionally, may permit the loading of additional results if there are more results to display. The results may be arranged in one of a number of ways, e.g. by decreasing confidence level, by name in ascending order, etc.

Communication channel status displays 702 and 718 can be similar to those displayed in FIG. 7. The Back text box 804 may be used to exit the screen 800. A result display field, e.g. 806-810, may be used (e.g. via tapping) to retrieve additional information associated with that match as shown on FIG. 9.

Example Identity Information Display Screen

Figure 9:
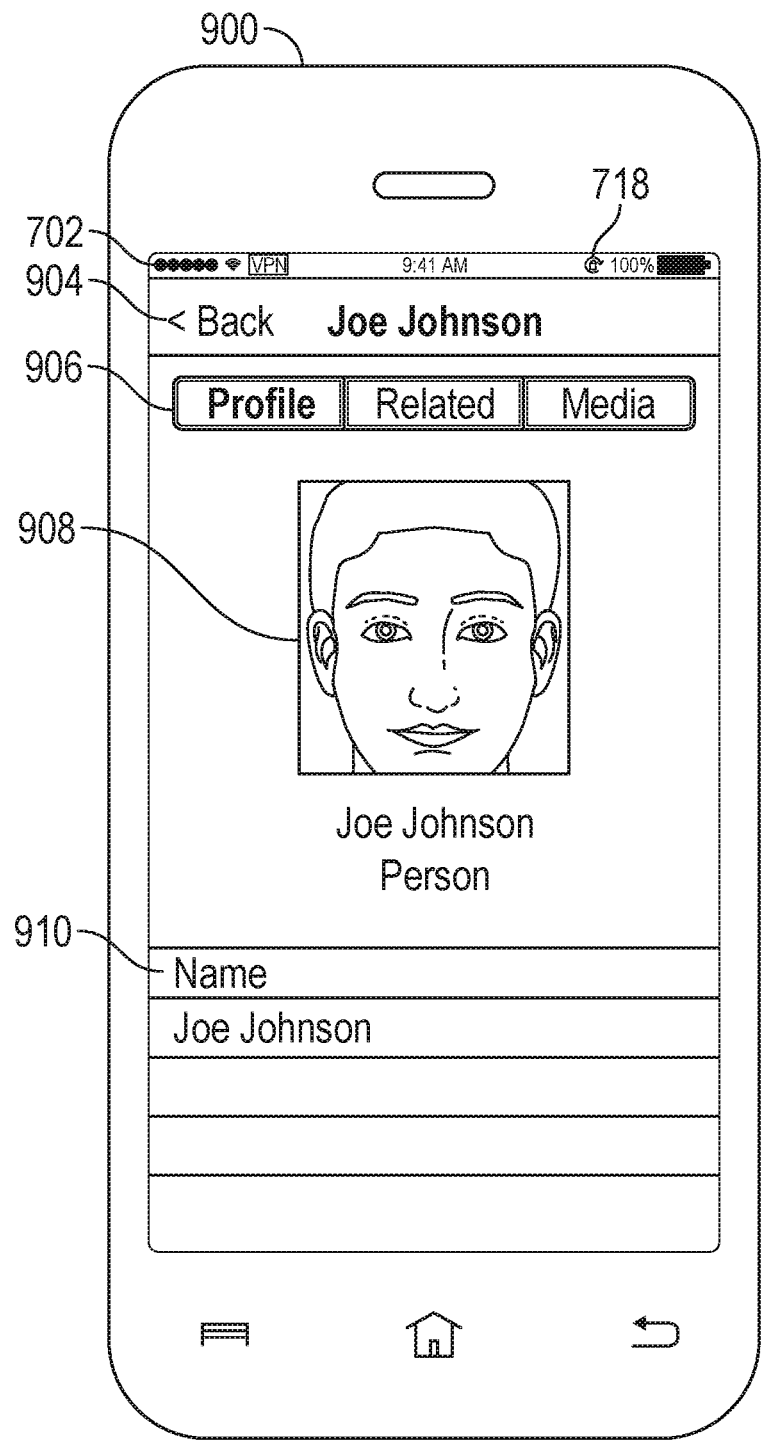
FIG. 9 illustrates an example GUI to display identification information.

FIG. 9 shows an example information display screen 900 which may be implemented on the mobile device 110. This screen may be displayed after a user selects a match from the one or more matched results presented, or, if there is only one match, be displayed after the system back end returns search results to the mobile device 110.

A communication channel status display 702 and an encryption on/off display 718 can serve the same functions as described above. A Back text box 904 may be used to exit screen 900. Box 906 can display various type of identity information associated with the selected match. For example, for a person search, a matched person's profile such as picture 908, name 910, date of birth, residential address, government-issued ID number, etc. may be displayed under the person's "Profile" category. A "Related" category may be used to display, for example, the person's employer, associates, etc. A "Media" category may be used to display information associated with the matched person on social media sites. The system can be configured to display other categories, or to display select pieces of information within each category. This may be done, for example, via the Object Centric Data Model framework discussed above. Furthermore, for different types of searches (e.g. person search, building/house search), the categories available for display may be different. The presentation of the display may be customized at the system level for all users in a system, at a sub-system level for a subset of users in a system (such as a mobile device team using a method disclosed in aforementioned U.S. patent application Ser. No. 13/839,026 titled "USE OF TEAMS IN A MOBILE APPLICATION"), or at a user level for each user or each mobile device 110. As stated above, the information available for display may be transmitted to the mobile device 110 together with the matches found by the system back end (a push model). Alternatively, the information to be displayed may be transmitted to the mobile device 110 when a user selects certain information to display (a pull model).

Example Mobile Device Request Process

Figure 10:
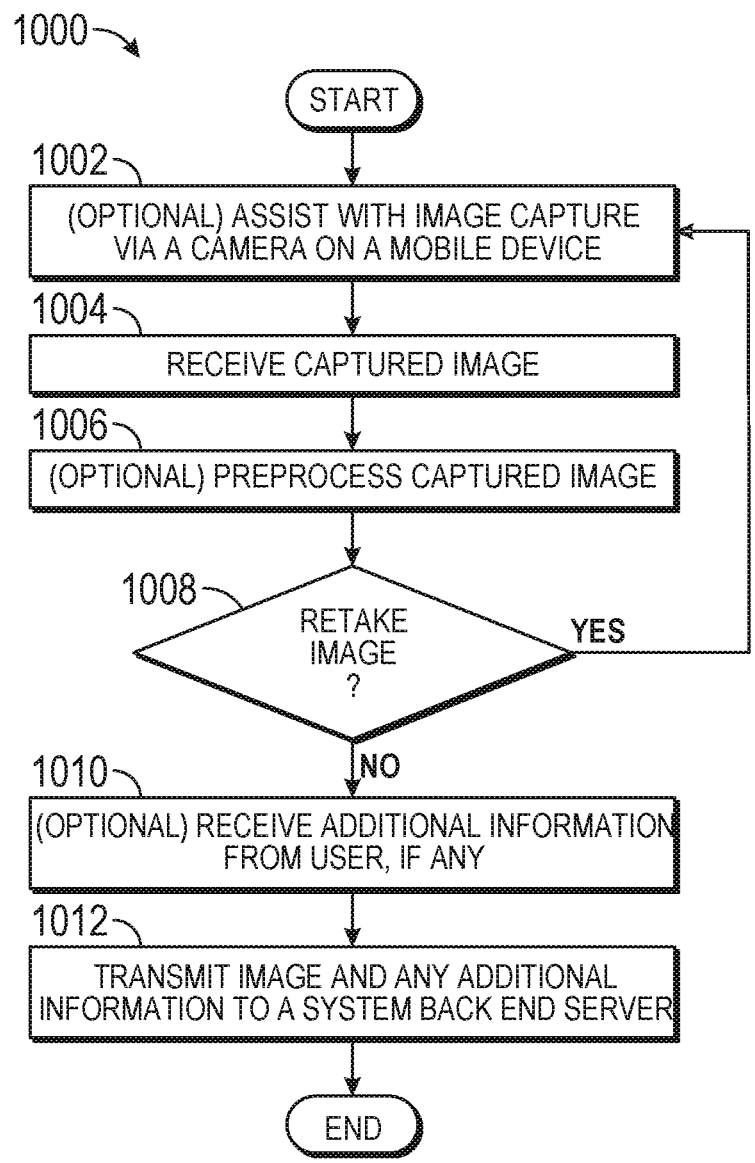
FIG. 10 illustrates a flowchart relating to an example mobile device request process of mobile image recognition.

FIG. 10 shows an example mobile device request process 1000. The process may start at an optional block 1002 wherein the system assists with image capture via a camera on a mobile device 110, as discussed in connection with FIG. 5. The assistance may be in a form of a rectangular box 506, an outline, or another form. The system receives a captured image at block 1004. The system may preprocess the captured image at block 1006, as discussed in connection with FIG. 1. This preprocessing can be for the purpose of determining if a retake of image is desirable, as discussed in connection with FIG. 6. At block 1008, the mobile device 110 may receive an instruction from a user to retake an image or to proceed to the next block. If a user desires to retake an image, the process can return to block 1002 and repeat. If a user desires to proceed, the system may request additional information associated with the image from the user. This can be accomplished, for example, with the aid of a GUI screen 700. At block 1012, the mobile device 110 transmits the captured image and any additional information associated with the captured image to the system back end.

Example System Back end Search Process

Figure 11:
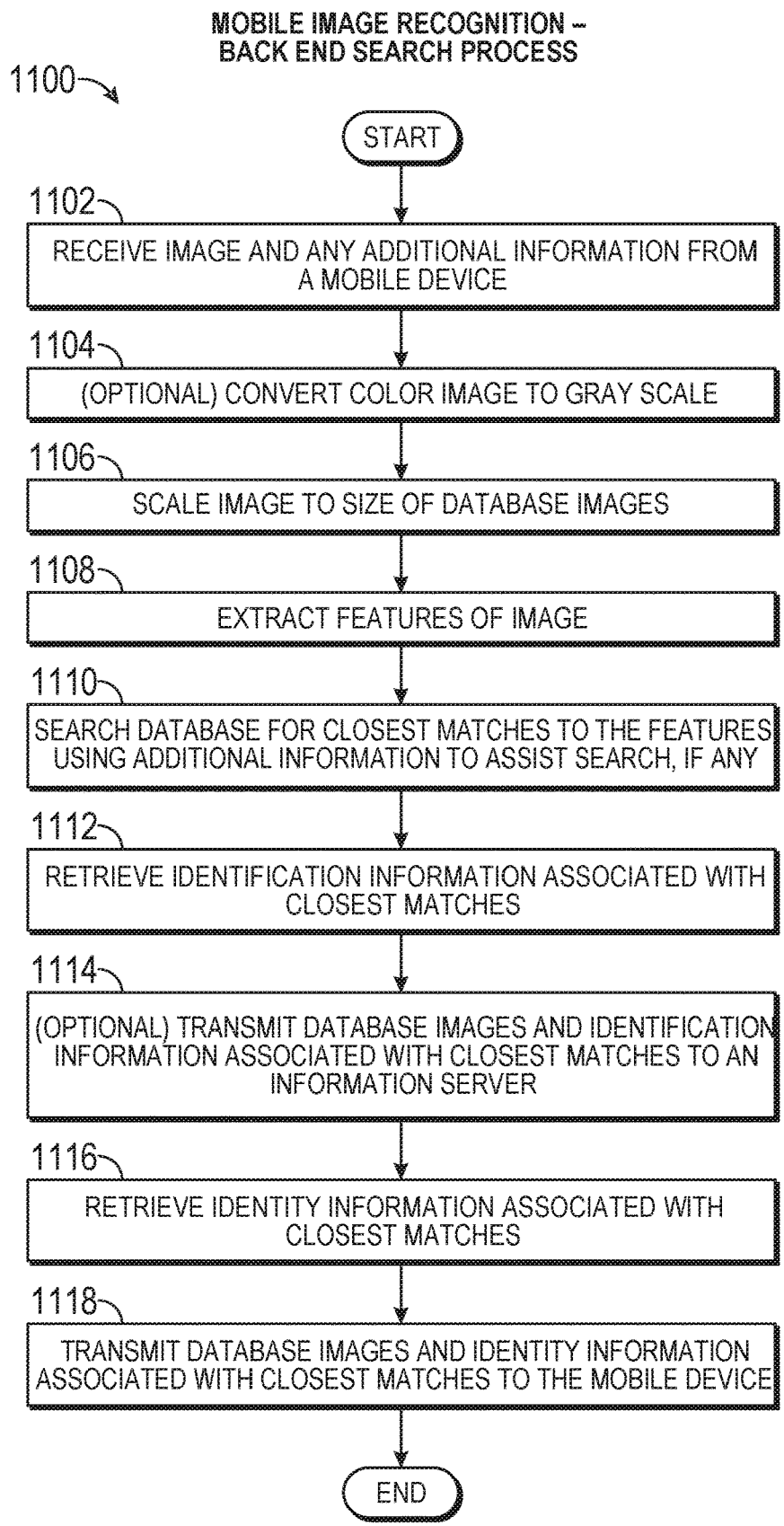
FIG. 11 illustrates a flowchart relating to an example back end search process of mobile image recognition.

FIG. 11 shows an example system back end search process 1100. At block 1102, the system back end receives an image and any additional information associated with the image from a mobile device 110. At block 1104, the back end may convert a color image to grayscale. As discussed above in connection with feature extraction, this conversion to grayscale may be desirable for the operation of certain feature extraction computations. The system back end can scale the received image to a standard size of reference images stored in the back end at block 1106.

At block 1108, the system back end can extract the features or feature set of the image. As described above in reference to FIG. 1, feature extraction may employ one or more algorithms such as scale-invariant feature transform, speeded up robust features, histogram of oriented gradients, etc. The system may have applied the same feature extraction process to reference images and may store the extracted reference feature sets in its database. As also described above in reference to FIG. 1, at block 1110, the system searches its database for closest matches among the reference feature sets to the received image feature set. The system may use any additional information associated with the image from a mobile device 110 to assist the search. For example, if a name is received along with an image, the system may limit its search to reference images associated with the same name or similarly sounding names. The system may find one or more closest matches among reference images to the received image. The closest matches may be chosen in part based on a preselected number of images, a minimum confidence level, or some other criteria. Alternatively or additionally, if a name is received along with an image, the system may be configured to increase the confidence level of a closely matched image which also has a matching or similarly-sounding name.

At block 1112, upon finding one or more closest matches, the system can retrieve identification information associated with the one or more closest matches. The information server ID, e.g. is_id 152 in FIG. 1, may be used as a pointer to identity information (e.g. name, address, etc. of a person) associated with the same reference image(s).

At block 1114, the system may transmit the reference images of the closest matches and the associated information server ID to an information server. As explained in connection with FIG. 1, the image matching server and the information server may be one, so this transmission does not have to take place between two servers. The transmission may take place between two databases associated with the same server, or even within a single database in certain embodiments. In any event, the identity information associated with the information server ID may be retrieved from an identity information database at block 1116. Identity information associated with a reference image/information server ID may be found through property values associated with the same data object as explained in connection with FIG. 2.

At block 1118, the reference image(s) and associated identity information of the closest reference image match(es) can be transmitted to the mobile device. This transmission may use a push or a pull model as described above.

Example Mobile Device Presentation Process

Figure 12:
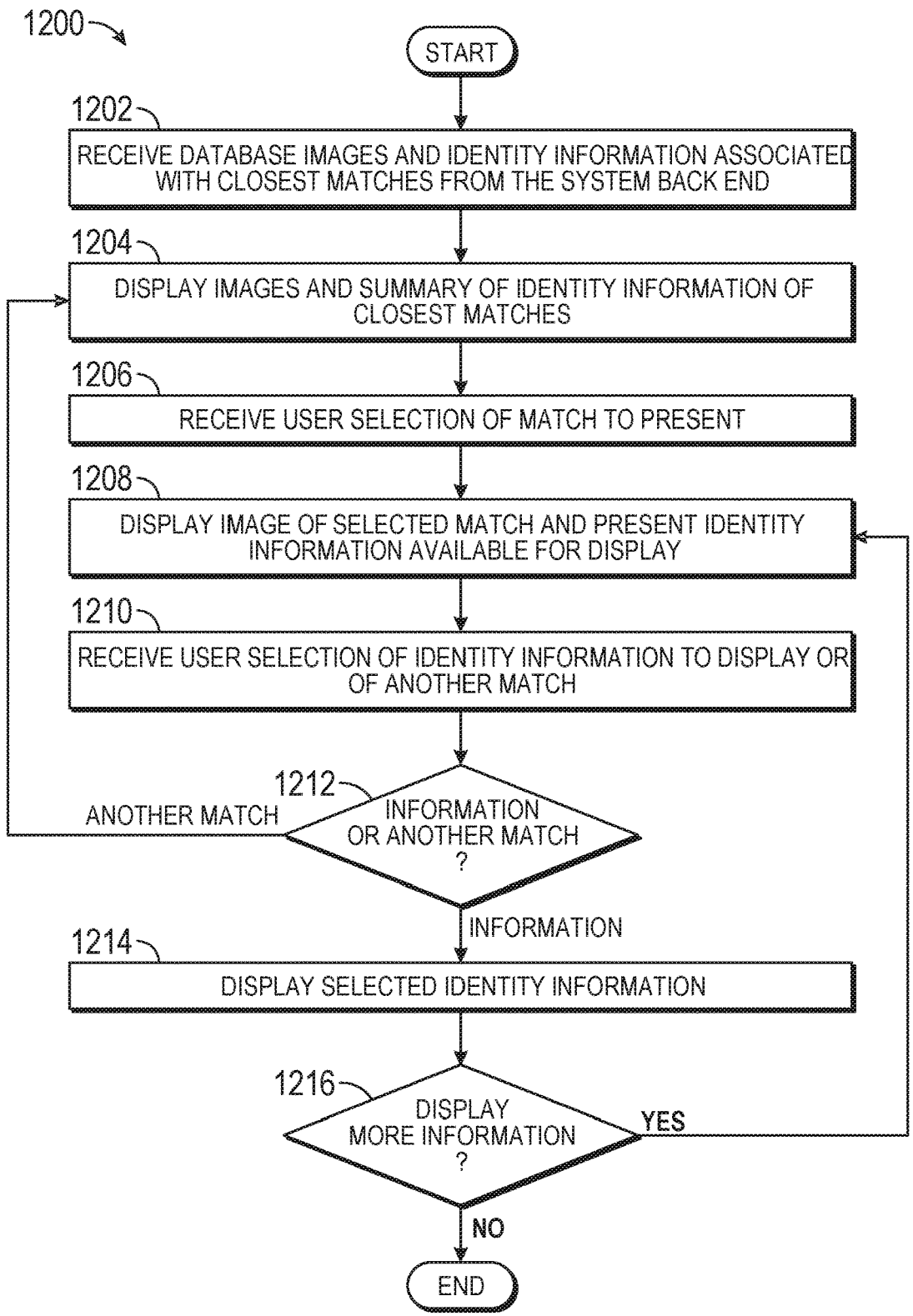
FIG. 12 illustrates a flowchart relating to an example mobile device presentation process of mobile image recognition.

FIG. 12 shows an example mobile device presentation process 1200. At block 1202, a mobile device receives the one or more closest match reference images and the associated identity information from the system back end. At block 1204, the mobile device can be configured to display images and key parameters/key identity information associated with the one or more closest matches. At block 1206, the system receives a user selection of a matched image to present. At block 1208, the system can present the selected match and associated image, certain identity information, and certain additional identity information or categories of identity information available for further display.

At block 1210, the system may receive a user input directing the system to present further information for the match currently on display (for example, through user activating a category in box 906) or to display another match (for example, through user activating "Back" text box 904. If the user requests the system to display another match, the process can return to block 1204 and continue therefrom. If the user requests the system to present further information associated with the current match, the system can display the selected information for further presentation at block 1214. The information for further presentation may have already been received by the mobile device at block 1202, or the user's selection of further information to present may trigger a process to retrieve the selected information from the system back end.

Upon displaying user selected identity information, the mobile device may receive another user input to terminate the process or to display more identity information associated with the match. If the user requests more identity information, the system may cause the mobile device to return to an identity information display screen 900 and return to block 1208 and continue the process therefrom.

An embodiment may include a feature to permit the user to request the system to add the captured image to the image data or identity information associated with a closest match. Another embodiment may include a feature to automatically add the captured image to the image data or identity information associated with a closest match after the system obtains a confirmation that a closest match to the captured image is a correct match. In either embodiment, the update can be an update to the database 134 and/or 164. Such updates to databases 134 and/or 164 may be generated using a method disclosed in aforementioned U.S. Pat. No. 9,123,086 titled "AUTOMATICALLY GENERATING EVENT OBJECTS FROM IMAGES."

An embodiment may include a feature to permit an image captured by one user mobile device and/or search results generated for one user mobile device to be shared with another user mobile device. Such feature may be implemented using a method disclosed in aforementioned U.S. patent application Ser. No. 13/831,199 titled "MOBILE REPORTS." Such sharing may be limited to a mobile device team using a method disclosed in aforementioned U.S. patent application Ser. No. 13/839,026 titled "USE OF TEAMS IN A MOBILE APPLICATION."

Terminology and Disclaimers

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A system for matching images and interacting with an external mobile device, the system comprising:
one or more computer-readable mediums configured to store computer-executable instructions; and
one or more processors, wherein the computer-executable instructions, when executed by the one or more processors, cause the system to:
receive, from a mobile device, an image and one or more user-provided parameters of information associated with the image;
access a data store storing images and information associated with the images;
determine, from among the images stored in the data store, one or more closest matching images to the received image;
retrieve, from the data store, information associated with the one or more closest matching images;
compare the received one or more user-provided parameters of information with the retrieved information;
based at least in part on the comparison, determine, from among the closest matching images, a filtered one or more closest matching images;
transmit, to the mobile device, the filtered one or more closest matching images.

2. The system of claim 1, wherein determining the filtered one or more closest matching images includes removing, from the one or more closest matching images, images associated with retrieved information that does not match the received one or more user-provided parameters of information.

3. The system of claim 1, wherein the computer-executable instructions, when executed by the one or more processors, further cause the system to:
receive, from the mobile device, a selection of a matching image from the filtered one or more closest matching images.

4. The system of claim 3, wherein the computer-executable instructions, when executed by the one or more processors, further cause the system to:
update the images or information associated with the images stored in the data store based on the selection of a matching image.

5. The system of claim 1, wherein the computer-executable instructions, when executed by the one or more processors, further cause the system to:
if the one or more closest matching images, or the filtered one or more closest matching images, comprises no images, then transmit, to the mobile device, a notification of no matching images and an option to submit a second image.

6. The system of claim 1, wherein the determination of the one or more closest matching images to the received image is based at least in part on the images in the data store and a threshold of confidence level.

7. The system of claim 6, wherein the threshold of confidence level is dynamically adjusted to change the number of closest matching images transmitted to the external mobile device.

8. The system of claim 7, wherein the number of closest matching images transmitted to the external mobile device is based at least in part on a preconfigured maximum number of matches.

9. The system of claim 1, wherein the computer-executable instructions, when executed, further cause the system to:
determine one or more closest matching images to the received image among the images in the data store, based in part on association between a closest match to the received image and a closest match to another image in the data store.

10. A computer-implemented method comprising:
by one or more processors executing computer-executable instructions:
receiving, from a mobile device, an image and one or more user-provided parameters of information associated with the image;
accessing a data store storing images and information associated with the images;
determining, from among the images stored in the data store, one or more closest matching images to the received image;
retrieving, from the data store, information associated with the one or more closest matching images;
comparing the received one or more user-provided parameters of information with the retrieved information;
based at least in part on the comparison, determining, from among the closest matching images, a filtered one or more closest matching images;
transmitting, to the mobile device, the filtered one or more closest matching images.

11. The computer-implemented method of claim 10, wherein determining the filtered one or more closest matching images includes removing, from the one or more closest matching images, images associated with retrieved information that does not match the received one or more user-provided parameters of information.

12. The computer-implemented method of claim 10, wherein the computer-executable instructions, when executed by the one or more processors, further cause the system to:
receive, from the mobile device, a selection of a matching image from the filtered one or more closest matching images.

13. The computer-implemented method of claim 12, wherein the computer-executable instructions, when executed by the one or more processors, further cause the system to:
update the images or information associated with the images stored in the data store based on the selection of a matching image.

14. The computer-implemented method of claim 10, wherein the computer-executable instructions, when executed by the one or more processors, further cause the system to:
if the one or more closest matching images, or the filtered one or more closest matching images, comprises no images, then transmit, to the mobile device, a notification of no matching images and an option to submit a second image.

15. The computer-implemented method of claim 10, wherein the determination of the one or more closest matching images to the received image is based at least in part on the images in the data store and a threshold of confidence level.

16. A non-transitory computer-readable medium storing a set of instructions that are executable by one or more processors to cause the one or more processors perform a method, the method comprising:

receiving, from a mobile device, an image and one or more user-provided parameters of information associated with the image;

accessing a data store storing images and information associated with the images;

determining, from among the images stored in the data store, one or more closest matching images to the received image;

retrieving, from the data store, information associated with the one or more closest matching images;

comparing the received one or more user-provided parameters of information with the retrieved information;

based at least in part on the comparison, determining, from among the closest matching images, a filtered one or more closest matching images;

transmitting, to the mobile device, the filtered one or more closest matching images.

17. The non-transitory computer-readable medium of claim 16, wherein determining the filtered one or more closest matching images includes removing, from the one or more closest matching images, images associated with retrieved information that does not match the received one or more user-provided parameters of information.

18. The non-transitory computer-readable medium of claim 16, wherein the computer-executable instructions, when executed by the one or more processors, further cause the system to:
receive, from the mobile device, a selection of a matching image from the filtered one or more closest matching images.

19. The non-transitory computer-readable medium of claim 18, wherein the computer-executable instructions, when executed by the one or more processors, further cause the system to:
update the images or information associated with the images stored in the data store based on the selection of a matching image.

20. The non-transitory computer-readable medium of claim 16, wherein the computer-executable instructions, when executed by the one or more processors, further cause the system to:
if the one or more closest matching images, or the filtered one or more closest matching images, comprises no images, then transmit, to the mobile device, a notification of no matching images and an option to submit a second image.

* * * * *

UNITED STATES PATENT AND TRADEMARK OFFICE
CERTIFICATE OF CORRECTION

PATENT NO. : 10,635,932 B2  
APPLICATION NO. : 16/414483  
DATED : April 28, 2020  
INVENTOR(S) : Goenka et al.

Page 1 of 1

It is certified that error appears in the above-identified patent and that said Letters Patent is hereby corrected as shown below:

On the Title Page

Column 1, item (72), Inventors, Line 8, delete "Cracow" and insert --Krakow--.

On page 2, Column 1, item (63), Related U.S. Application Data, Line 1, delete "15/701,886," and insert --15/071,886,--.

In the Specification

Column 5, Line 58, delete "mySQL" and insert --MySQL--.

Column 17, Lines 54-55, delete "nontransitory" and insert --non-transitory--.

Column 23, Line 10, delete "904." and insert --904).--.

Signed and Sealed this  
Fourth Day of August, 2020

Andrei Iancu  
*Director of the United States Patent and Trademark Office*